United States Patent [19]

Ossfeldt et al.

[11] Patent Number: 4,815,025
[45] Date of Patent: Mar. 21, 1989

[54] ARRANGEMENT FOR SUPERVISING A DATA PROCESSING SYSTEM

[75] Inventors: Bengt E. Ossfeldt, Älvsjö; Ulf E. Palmgren, Stockholm, both of Sweden

[73] Assignee: Telefonaktiebolaget LM Ericsson, Stockholm, Sweden

[21] Appl. No.: 803,063

[22] PCT Filed: Mar. 26, 1985

[86] PCT No.: PCT/SE85/00132

§ 371 Date: Nov. 14, 1985

§ 102(e) Date: Nov. 14, 1985

[87] PCT Pub. No.: WO85/04736

PCT Pub. Date: Oct. 24, 1985

[30] Foreign Application Priority Data

Apr. 6, 1984 [SE] Sweden .................. 8401941-3

[51] Int. Cl.[4] ............... G06F 13/06; H04L 11/00
[52] U.S. Cl. ..................................... 364/900
[58] Field of Search ... 364/200 MS File, 900 MS File

[56] References Cited

U.S. PATENT DOCUMENTS

| | | | |
|---|---|---|---|
| 3,611,315 | 10/1971 | Murano | 364/200 |
| 3,633,175 | 1/1972 | Harper | 364/200 |
| 3,902,163 | 8/1975 | Amdahl et al. | 364/200 |
| 3,916,405 | 10/1975 | Gotanda | 340/533 |
| 3,921,168 | 11/1975 | Dunbar | 340/533 |
| 4,045,779 | 8/1977 | Markle | 364/200 |
| 4,087,855 | 5/1978 | Bennett et al. | 364/200 |
| 4,089,063 | 5/1978 | Takezono et al. | 364/200 |
| 4,093,819 | 6/1978 | Saito et al. | 178/4.1 R |
| 4,393,461 | 7/1983 | Holtey et al. | 364/900 |
| 4,403,300 | 9/1983 | Bavoux et a l. | 364/900 |
| 4,482,802 | 11/1984 | Aizawa et al. | 235/379 |
| 4,639,889 | 1/1987 | Matsumoto et al. | 364/900 |

FOREIGN PATENT DOCUMENTS

| | | | |
|---|---|---|---|
| 0023265 | 1/1986 | Japan | 364/200 |
| 0039669 | 2/1986 | Japan | 379/34 |
| 0123964 | 6/1986 | Japan | . |
| 0133457 | 6/1986 | Japan | . |
| 0185295 | 6/1986 | Japan | 379/34 |

*Primary Examiner*—Thomas M. Heckler
*Assistant Examiner*—Viet O. Nguyen
*Attorney, Agent, or Firm*—Roberts, Spiecens & Cohen

[57] ABSTRACT

A data processing system which includes an address bus connected to k computer elements is supervised with the aid of an arrangement including a plurality of indication registers connected to the bus and to an error signal generator. The address bus is capable of transferring $2n > k$ binary addresses. The indication registers are each accessed by its address transferred through the bus and each register stores an indication if its address is also assigned one of the computer elements. The generator generates an error signal on the reception of an indication that an address being transferred through the bus is not assigned a computer element.

4 Claims, 1 Drawing Sheet

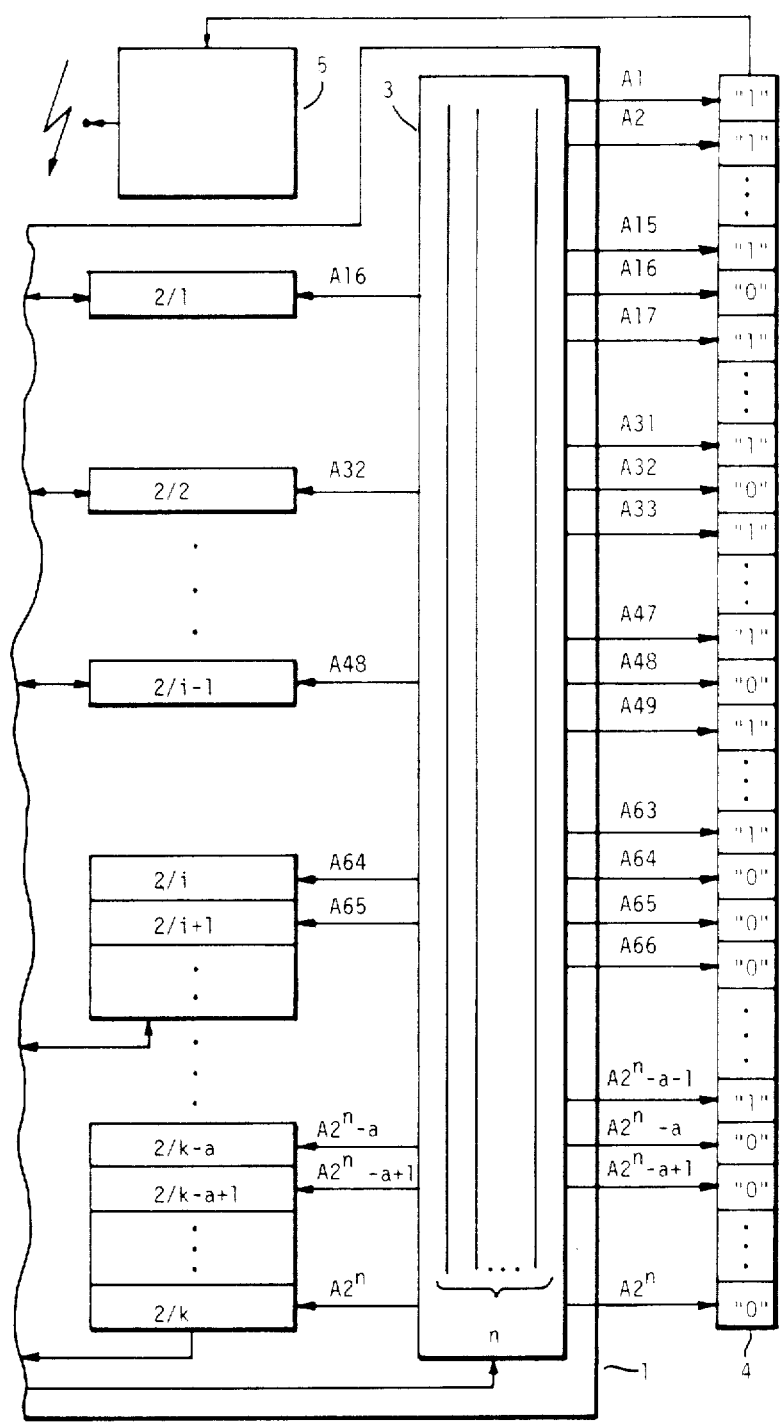

ARRANGEMENT FOR SUPERVISING A DATA PROCESSING SYSTEM

FIELD OF INVENTION

The present invention relates to an arrangement for supervising a data processing system adapted for controlling telecommunication equipment and including an address bus with the ability of transferring $2^n$ addresses one at a time, the bus being connected to k computer elements, such as memory locations and input/output terminals, which are each accessed by an assigned binary address transferred through the bus and associated with a first category of k addresses used in data processing, there being available an address redundance consisting of $2^n$-k addresses of a second category, which are not used while data processing is going on.

BACKGROUND

Synchronous duplicating with comparison, multiple redundancy with majority selection, and parity checking, as well as time supervision in the form of "watch dog" and microprogrammed pointer control, are known principles for supervising a data processing system. Even if it is only partially used, duplication is very expensive in many cases. Parity checking requires a rather considerable increase in the number of components used. Pointer control and parity generation mean increased access times relative to the data processing. Time supervision results in tardy error detection.

The state of the art is dealt with, for example, in "12th Annual International Symposium on Fault-Tolerant Computing" (ISSN number 0731-3071), Session 6B On-Line Monitoring, pages 237-256.

SUMMARY OF INVENTION

Based on the fact that addresses transferred through an address bus are formed in a known manner with the aid of data transportation and data calculations, there is obtained in supervising addresses, in accordance with the invention, an indirect supervision of data processing in, for example, a stored-program controlled telecommunication system.

The inventive arrangement is characterized by an insignificant addition of components, more specifically at most $2^n$ simple indication registers connected to the address bus, the outputs of the registers being connected to an error signal generator.

A condition for the inventive supervision principle is that the address bus has an excess capacity in relation to the number of computer elements connected thereto, i.e., such that $2^n > k$. This condition often exists, particularly in modern microprocessors, with n=16 and in applications of computer elements in which only a minor portion of the possible addresses is used, so that there can be thus obtained the above-mentioned two categories of addresses.

In accordance with the invention, the indication registers store the information as to the category affinity of their addresses. Since correct data processing only results in addresses of the first category, an error signal is generated from every indication obtained by the registers that an address transferred through the bus is included in the second category. The greater the address redundancy of the data processing system, the greater chance there is that the simple inventive supervision arrangement discovers data processing errors.

BRIEF DESCRIPTION OF DRAWING

The invention will next be described in detail with reference to the accompanying drawing, in which the sole FIGURE illustrates a block diagram of a preferred embodiment of the invention.

DETAILED DESCRIPTION

The drawing illustrates an address bus 3 and computer elements 2 in a conventional data processing system 1, and a supervision arrangement which includes an error signal generator 5 and indication registers 4 connected to the address bus.

In the data processing system 1, there are indicated the computer elements 2/1, 2/2 . . . 2/k, the access inputs of which are connected to an address bus 3. The address bus is capable, with the aid of n parallel lines, of transferring $2^n$ binary address numbers one at a time, these numbers coming in, for example, from an address calculation unit (not shown). Each of the access inputs of the computer elements is connected to its own output of a conventional address decoder (not shown) included in the bus. Access to an element is obtained when a first category address number assigned to this element is transferred through the bus. The drawing illustrates individual computer elements 2/1, 2/2 . . . 2/i−1 (e.g., input/output terminals) each with its individual address number A16, A32, A48 and series of elements 2/i, 2/i+1 . . . 2/k-a . . . 2/k (e.g.,) memory locations for storing instruction sequences, with successively increasing address numbers A64, A65 . . . , A$2^n$-a . . . A$2^n$. The drawing further shows address bus outputs, the associated address numbers of the second category, (e.g., A1 . . . A15, A49 . . . A63) constitute the address number redundancy of the data processing system.

The address bus is connected to a plurality of indication registers 4 for storing address category indication bits. Each of the $2^n$ address numbers which can occur in the bus activates its own register for the reading of the same, the respective stored information being transferred to an error signal generator 5. All k registers with associated first category address numbers, e.g. A64, store a binary "zero" and all $2^n$-k registers with associated second category address numbers, e.g. A1 . . . A15, store a binary "one". The generator 5 generates an error signal from an instant second category address number, which does not achieve access to a computer element.

The supervision arrangement must include as many indication registers as enable a reliable indication of an instant address category association. Reliable indication is achieved by an arrangement which includes only $2^n$-k registers which are activated for reading each on reception of its second category address number, a binary "one" obtained from the registers indicating a data processing error. A further arrangement includes only k registers, which are each activated for reading a stored binary "one" on reception of its first category address number, the outputs of these registers being connected to an inverting AND gate input activated in its rest position. A conventional strobe signal is used, which indicates each address transferred through the bus, to activate the other AND gate input. If no register is accessed, the AND gate sends the strobe signal to the activating input of the error signal generator.

We claim:

1. Apparatus for detecting an error in a data processing system including an address bus adapted for transferring $2^n$ addresses one at a time, said system including solely k computer elements to which said bus is connected and which are accessed by a related binary address transferred through the bus and associated with a first category of k addresses used for data processing, $2^n$ being greater than k, there being $2^n$-k addresses of a second category which are not used during operation of the data processing system, said apparatus including a plurality of indication registers connected to the bus and each being activated to output, on reception from the bus of a particular one of said $2^n$ addresses, a stored indication of one of said two address categories, which one address category includes the particular one of the addresses, and a generator means connected to said indication registers for generating an error signal on the reception of an indication that the address being transferred through the bus is associated with the second category.

2. Apparatus as claimed in claim 1, comprising $2^n$ of said indication registers, each being assigned to one of said $2^n$ addresses.

3. Apparatus as claimed in claim 1 comprising $2^n$-k indication registers, each being assigned to a second category address.

4. Apparatus as claimed in claim 1, comprising k of said indication registers, each being assigned to a first category address.